United States Patent [19]

Jokela

[11] Patent Number: 4,668,000

[45] Date of Patent: May 26, 1987

[54] SIDE LIMIT POST FOR A LOAD-CARRYING SPACE

[76] Inventor: Heikki Jokela, SF-66530, Koivulahti, Finland

[21] Appl. No.: 835,540

[22] Filed: Mar. 3, 1986

[51] Int. Cl.$^4$ ............................................. B62D 35/00
[52] U.S. Cl. .......................................... 296/15; 410/37
[58] Field of Search .................... 296/15, 1 R; 410/37

[56] References Cited

U.S. PATENT DOCUMENTS 1,392,343  10/1921  Leishman ............................. 410/37
4,193,730   3/1980  Nordin ................................. 410/37
4,375,893   3/1983  Curtis .................................... 296/43

Primary Examiner—Robert R. Song
Attorney, Agent, or Firm—Delbert J. Barnard

[57] ABSTRACT

A side limit post for load-carrying space, comprising a main profile (1) and possibly an extension profile (16). The cross-sectional profile is approximately quadratic in its main dimensions and rounded in its leading corners and side walls. The outer profile wall is provided with turbulence-generating means, with one or a plurality of said means in the leading wall, leading corners, side walls, trailing corners and/or trailing wall of such profile.

8 Claims, 10 Drawing Figures

SIDE LIMIT POST FOR A LOAD-CARRYING SPACE

DESCRIPTION

The present invention relates to a side limit post for the load-carrying space of vehicles for carrying elongated bodies, especially for carrying timber. The actual transportation can be performed by a railway car, a truck, its trailer or the like.

Prior known are side limit posts for this purpose, made of a pipe with round or rectangular cross-section. A drawback with these is their great weight since, due to the manufacturing technique, the cross-sectional profile must have the wall of uniform thickness and, in order to provide necessary bending resistance (the main loading direction being away from the load-carrying space), the structure will have an unfavorable strength/weight ratio.

In the above case, efforts have been made to improve the strength/weight ratio e.g. by welding extra material to the side walls furthest away from the neutral axis of the deflection caused by said main loading, whereby the whole structural unit can be made with proper dimensioning superior to the one with uniform wall thickness.

Another way of improving the strength/weight ratio has been to employ extrusion technique, whereby thickness of the walls furthest away from said neutral axis can be selected to be optimum with respect to the thickness of the walls approximately perpendicular to the neutral axis (of course there are limitations to this; variations of the wall thickness must not be too drastic).

With the present operating energy costs in vehicle engineering, the dead weight of equipment and structures must be as low as possible for efficient transport performance, as noted above. In fact, this has been taken into consideration in available post designs within the limits set by manufacturing costs.

Haulage, of course, always involves return travel as well which, in the present case, is generally driven unloaded and as the operation should be kept efficient, this should be done at a considerable driving speed. Thus, the total air drag created by several side limit posts is of essential significance and the thorough consideration of this has an effect on the post structure. In terms of the power necessary for overcoming the air drag, an unloaded return drive is also significant in the sense that, with a load placed in the load-carrying space, the partial effect of side limit posts on the air drag is minor.

Hence, an object of this invention is to provide such a side limit post for a load-carrying space wherein thorough attention has been paid not only to an advantageous strength/weight ratio but also to the effect of air drag on the economy of haulage.

According to the invention, this is accomplished by designing a side limit post for a load-carrying space which, combined with an advantageous strength/weight ratio and originally preferable aerodynamic design, takes into consideration the decrease of drag force according to the principles of aerodynamics in certain conditions of flow. Said conditions and a post structure designed on the basis of conclusions drawn therefrom will be clear from the following specification and claims of the invention.

Thus, a significant improvement will be achieved in the haulage ecnomy by means of a design of the invention.

The invention will now be described in more detail with reference made to the accompanying drawings, in which.

Figure 1:
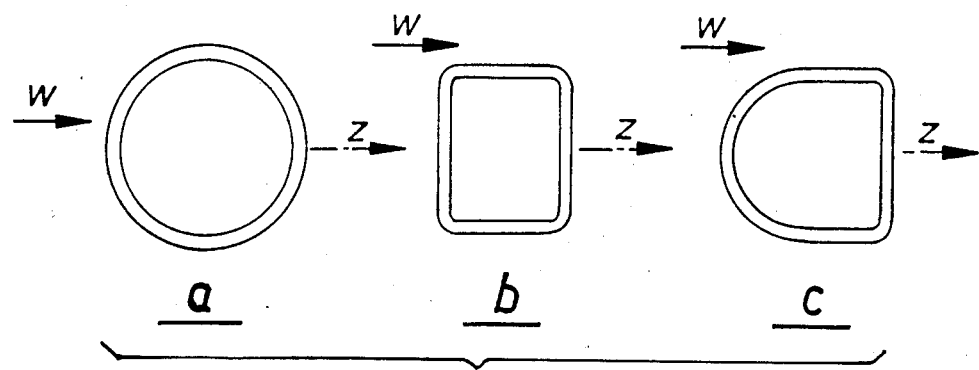
FIG. 1 illustrates post cross-sections forming the basis of theoretical study.

The following deals with the theoretical background of the invention:

Reference is first made to the post profiles shown in FIG. 1. Measures in FIG. 1 are millimeters and the profiles themselves are of course merely shown by way of an example to illustrate the invention.

The bending resistances of these profiles with respect to z-axis (neutral axis in main loading direction) as well as surface areas (representing profile weights per meter) are as follows:

|  | a | b | c |
|---|---|---|---|
| Bending resistance cm$^3$ | 36,25 | 36,85 | 36,60 |
| Surface area cm$^2$ | 16,31 | 12,11 | 12,62 |

It can be noted that about the above three equally strong (bending resistances approximately equal), case a is clearly disadvantageous as to its metric weight while cases b and c are practically equal.

The following aerodynamic study is effected with air-stream in the direction of arrow w (FIG. 1), and the external conditions: Calm weather, temperature 0° C. and air pressure 1 kp/cm$^2$. Thus obtained:

$$\text{Kinematic viscosity of air } \nu = 13{,}3 \cdot 10^{-6} \frac{m^2}{s}$$

($TKI_{51}$, p. 678)

$$\text{Density of air } \rho = 1{,}293 \frac{kg}{m^3} \quad (TKI_{51}, \text{ p. 394})$$

The above parenthesized reference $TKI_{51}$ refers to the following work: Tekniikan Käsikirja (Technical Handbook), Vol. 1, K. J. Gummerus Oy, Jyväskylä, 7th ed., 1951.

The height of a side limit post in all cases a, b and c is 2.6 meters.

$$\text{Reynolds number } Re = \frac{\rho w \lambda}{\eta} = \frac{w \lambda}{\nu}$$

-continued (TKI$_{68}$, p. 213)

The above parenthesized reference TKI$_{68}$ refers to the following work: Tekniikan käsikirja (Technical Handbook), Vol. 1, K. J. Gummerus Oy, Jyväskylä, 8th ed., 1968.

Furthermore, the above Re formula includes λ for the sake of clarity and it refers in each case to the dimension characteristic of a profile: in case a λ=0.120 m, in case b λ=0.110 m and in case c λ=0.1045 m.

w=velocity.

The resistance of flow of the posts is calculated from the equation:

$$W = C_w \frac{\rho}{2} v^2 S \quad (TKI_{51}, \text{ p. 425})$$

or indicated with various symbols:

$$F = \tfrac{1}{2} C_D \rho w^2 l^2 \quad (TKI_{68}, \text{ p. 214})$$

$S = l^2$ = reference surface
$v^2 = w^2$ = square of velocity
$C_w = C_D$ = drag coefficient In the following calculations, the values of drag forces have been calculated at three velocities: 50 km/h, 70 km/h and 100 km/h (=13.88 m/s, 19.44 m/s and 27.77 m/s).

CASE A

λ=0.120 m, whereby e.g. at velocity 13.88 m/s the Reynolds number Re:

$$Re = \frac{13.88 \cdot 0.12}{13.3 \cdot 10^{-6}} = 1.25 \cdot 10^5,$$

the Re's being calculated the same way for velocities 70 and 100 km/h.

In this case, $C_D = 0.882$ which is obtained by interpolating from table TKI$_{51}$, p. 426, No. 3. The value of said table being $1/d = 2.6/0.12 = 21.66$. Reference surface $S = 0.12 \cdot 2.6$ m$^2$, the drag force at velocity 13.88 m/s being:

$$W = \frac{0.882 \cdot 1.293 \cdot 0.12 \cdot 2.6 \cdot 13.88^2}{9.81 \cdot 2} \, kp = 3.49 \, kp.$$

The drag forces are calculated the same way at velocities 70 and 100 km/h.

Also calculated is value 28·W, indicating that a Finnish timber truck and a full-size trailer unit pulled thereby can be fitted with 28 posts (14 posts/side).

Obtained is the following table:

| w<br>km/h | Re<br>$10^5$ | W<br>kp | 28W<br>kp |
|---|---|---|---|
| 50 | 1,25 | 3,49 | 97,7 |
| 70 | 1,75 | 6,85 | 191,8 |
| 100 | 2,50 | 13,99 | 391,7 |

CASE B

Reynolds number Re is calculated with λ=0.11 m.

Drag coefficient $C_D = (7/11) \cdot 1.5$, wherein the coefficient is decreased by the thickness ratio of the profile in the direction of flow 7/11 with respect to a rectangular plate (TKI$_{51}$, p. 426, No. 2). Figure 1.5 is obtained from the above-mentioned plate case by assessing from tabulated values $$a/b = 2.6/0.11 = 23.63 > 18 \text{ and } < \infty.$$

Reference surface $S = 0.11 \cdot 2.6$ m$^2$.

Inclusion in the formulae of Reynolds number and flow resistance gives the table:

| w<br>km/h | Re<br>$10^5$ | W<br>kp | 28W<br>kp |
|---|---|---|---|
| 50 | 1,15 | 3,46 | 97,0 |
| 70 | 1,61 | 6,80 | 190,3 |
| 100 | 2,30 | 13,87 | 388,3 |

CASE C

Figure 2:
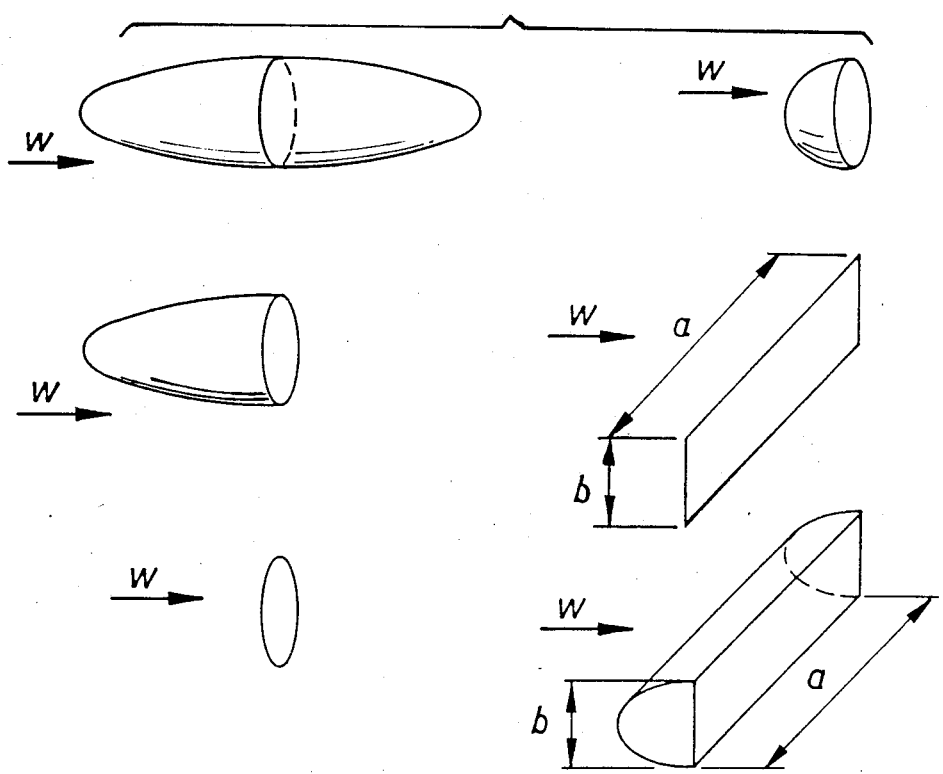
FIG. 2 illustrates the model shapes involved in theoretical study.

Reynolds number Re is calculated with λ=0.1045 m. In this case, reference is made to FIG. 2 for determination of the value of $C_D$. In FIG. 2, the $C_D$ figures of the various elements are as follows:

2.1  $C_D = 0.054$, when Re $= 2.2 \cdot 10^5$ (TKI$_{68}$, p. 222)
2.2  $C_D = 0.3$ when Re $= 2.2 \cdot 10^5$ (TKI$_{68}$, p. 222)
2.3  $C_D = 1.12$ when Re $= 2.2 \cdot 10^5$ (TKI$_{68}$, p. 222)
2.4  $C_D = 0.34$ (TKI$_{51}$, p. 426, No. 4, I)
2.5  $a/b = 24.88$ from which is assessed
       $C_D = 1.6$ (TKI$_{51}$, p. 426, No. 2: 18 < 24, 88 < ∞)
2.6  When approximating the numerical value of $C_D$, first is used the average $(0.3 + 0.34):2 = 0.32$ of the values of "half-cigar" and "semi-sphere" (respectively 2.2 and 2.4). Said average is corrected by multiplying with ratio of rectangular plate 2.5 and round plate 2.3, the drag coefficient in case being:
       $C_D = 0.32 \, (1.6/1.12) = 0.457$.
       Reference surface $S = 0.1045 \cdot 2.6$ m$^2$.

Inclusion in the formulae of Reynolds number and flow resistance gives the table:

| w<br>km/h | Re<br>$10^5$ | W<br>kp | 28W<br>kp | 28W'<br>kp |
|---|---|---|---|---|
| 50 | 1,09 | 1,58 | 44,1 | 11 |
| 70 | 1,53 | 3,09 | 86,6 | 22 |
| 100 | 2,18 | 6,31 | 176,7 | 44 |

Attention is now paid to an essential aspect: Reynolds number, especially at the higher values of velocity, is very close to the range of $2 \cdot 10^5 - 5.5 \cdot 10^5$ set out in reference TKI$_{68}$, p. 222. Thus, this is a situation where the $C_D$-value of an inadequately streamlined element may drop down to about a quarter when compared to the $C_D$-values below said Re-number range $2 \cdot 10^5 - 5.5 \cdot 10^5$. In this connection, reference is also made to FIG. 39 on page 214 and to FIG. 42 on page 221, both in the cited reference TKI$_{68}$.

Thus, by using the quarter value of the original $C_D$, the last column 28W' of the case c table is obtained.

In order to clear the significance of the above phenomenon, cases b and c are compared to each other:

Power required for overcoming air drag:

$P$=drag force·$w$

Producing the table:

| w<br>km/h | Case a<br>hp | Case b<br>P<br>hp | Case c<br>P<br>hp | Case c (28W')<br>P<br>hp |
|---|---|---|---|---|
| 50 | 18,1 | 18 | 8,2 | 2,0 |
| 70 | 49,7 | 49,7 | 22,4 | 5,7 |
| 100 | 145,03 | 143,7 | 65,4 | 16,3 |

In practice, such enormous reduction of the required power cannot be achieved as other factor influence the situation, e.g. the fact that the posts on each side of the load-carrying space loaded in the same line, so the air stream meeting each individual post profile has already been more or less disturbed depending on the location of a particular post because of the effect of the post immediately ahead (except for the foremost post). Furthermore, e.g. in the case of a truck, the vehicle cabin also produces a wide turbulence area within the area of its trailing flow.

However, what has just been said cannot completely annul the facts set forth in the calculative study above. For example, the calculations do not account for the effect of backward wind which exceeds that of forward wind (the power required for overcoming air drag being proportional to the 3rd power of velocity). It should further be noted that the profile shape shown in case c is not the best conceivable if modern facilities, offered mainly by extrusion techniques, are utilized.

Hence, a conclusion of what has been presented above is that a post of the invention takes advantage of practically feasible "streamlining" as well as the reduction of $C_D$-value over a certain Re-range, as pointed out in connection with case c.

Figure 3:
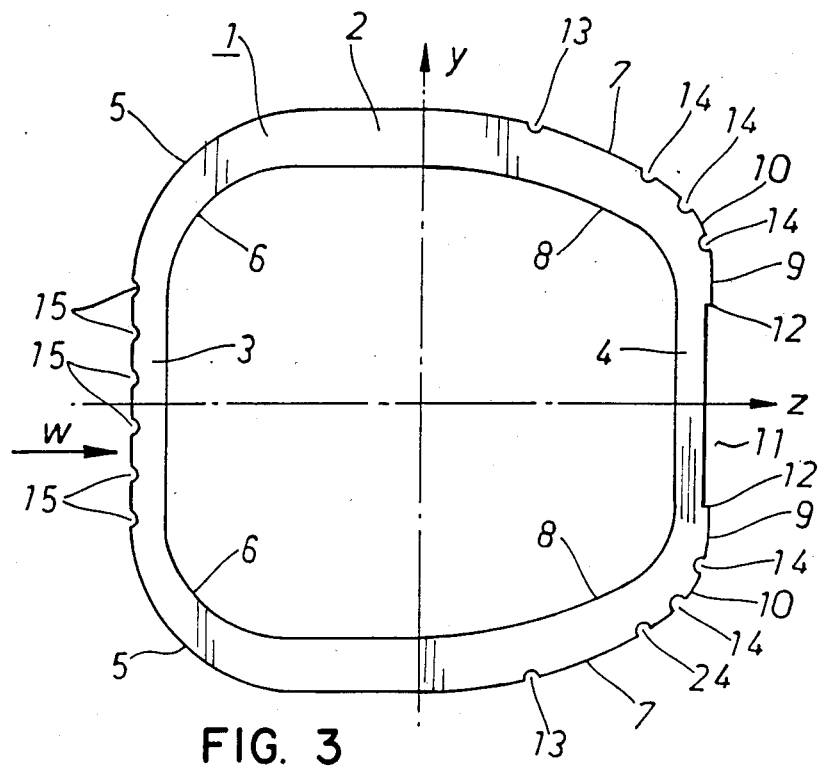
FIG. 3 shows a cross-section of a post design of the invention.

FIG. 3 shows one embodiment of the profiled cross-section of a post member of the invention. Profile 1 is tubular as shown in FIG. 3 and, as set forth in the introduction, its wall thickness is such that the walls 2 furthest away from the neutral axis of the main loading direction are suitably thicker than the walls 3 and 4 perpendicular to said neutral axis z of the main loading direction. This is to make the strength/weight ratio as advantageous as possible. In the present example, the profile is substantially symmetrical relative to z-axis and roughly quadratic in its main dimensions. With respect to the main travelling direction, the leading wall 3 (the upcoming airflow is indicated by arrow w) merges with the side walls 2 by arcuate portions 5 on its outer surface and by arcuate portions 6 on its inner surface for providing a uniform increase in wall thickness from leading wall 3 to side walls. 2. At around the center axis y, which is parallel to the main loading direction, the outer surfaces of walls 2 begin to curve in rearward direction towards z-axis with a radius of curvature exceeding or equal to what was the mean radius of arched portion 5. This arching is indicated by reference numeral 7. The inner surface curves in the same uniform manner from around said y-axis towards the inner surface of the trailing wall 4, as indicated with reference numeral 8.

The arched portion 7 merges with the rearmost surface 9 of said trailing wall 4 within an area 10, the outer surface being also rounded at the junction of said walls. The same is also true with the inner surface.

In the present example, the rear surface of trailing wall 4 can be provided with a dished section 11, whose edges 12 may serve as jigs for e.g. a reflection/measurement sticker.

As indicated in FIG. 3, following the outset point of a trailing section of the flow passing the y-axis area, the outer profile surface is provided with a recess 13 which acts as "a turbulence generator" for creating the phenomenon mentioned on page 221 of reference $TKI_{68}$ in "a forced manner" at rates of velocity w lower than what would be possible without recess 13 or recesses 13. Thus, the early generation of turbulence makes the main flow resemble more an ideal ("completely streamlined") case and pressure drag declines (reference is made here to the behavior of a golfball as an analogous phenomenon). The generation of early turbulence within the trailing section around an area 10 is further assured by means of one of a plurality of additional recesses 14.

Thus, within the limits permitted by practical viewpoints, the objective with the above-described profile is to design (a) a leading surface as well rounded as possible and (b) to use recesses in the trailing edge area so that, with velocities exceeding a completely laminar flow (in practice very low speeds with no significance as such in terms of air drag), due to the generation of early turbulence in the trailing edge area, it is possible to reach such a range of main flow within which $C_D$ abruptly declines.

Depending on the results of model tests with a precise profile shape for any particular purpose, the front surface of said leading wall 3 of profile 1 may also be provided with recesses 15 (see $TKI_{68}$, p. 222).

Figure 4:
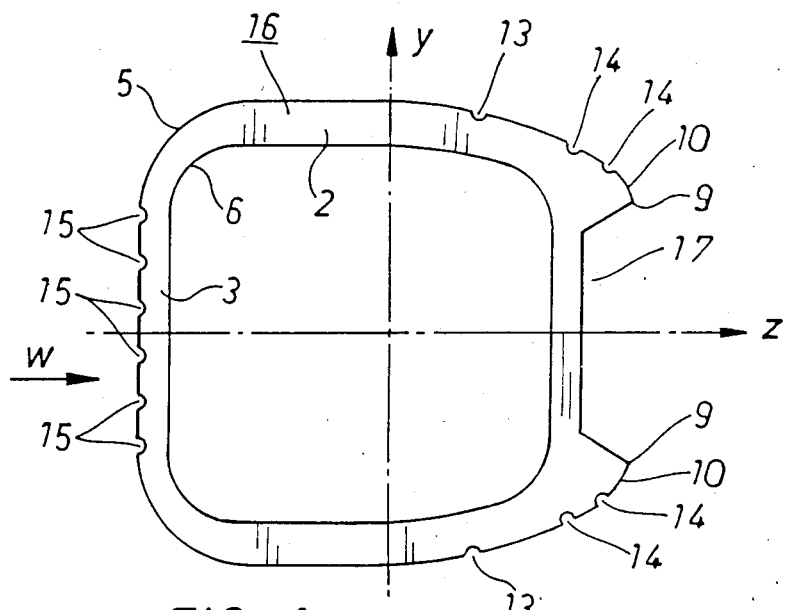
FIG. 4 shows another cross-section of a design of the invention.

FIG. 4 shows the cross-sectional shape of a post extension profile 16 that fits slideably within the post profile shown in FIG. 3. The extension profile 16 is generally of the same shape as the main profile 1 shown in FIG. 3 but in this case the trailing wall 4 is pushded drastically forward, the profile rear edge pushing forward (considering the main travelling direction relative to w) from the area 10, 9 for building a recess 17.

Figure 5:
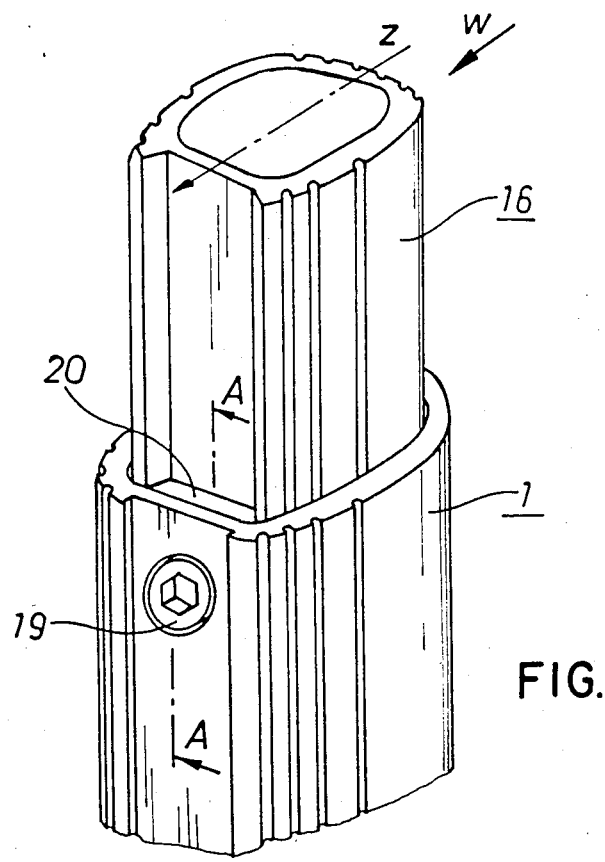
FIG. 5 shows a detail at the junction between a side limit post and its extension.
Figure 6:
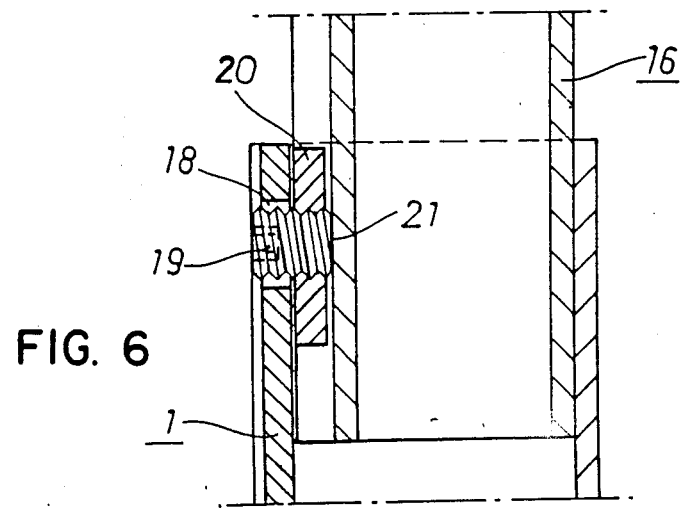
FIG. 6 is a section along line A—A in FIG. 5.

The purpose of recess 17 is apparent from FIGS. 5 and 6. The top portion of the trailing wall of said main profile 1 is provided with an aperture 18 through which is passed a screw 19 which is screwed in a threaded hole in an element 20. When said screw 19 is loosened, its inner end 21 disengages from the rear surface of the trailing wall of extension profile 16 for adjusting the vertical position of said extension profile. After a proper adjustment, said screw 19 is tightened for holding the extension profile 16 in position. Of course, screw 19 holds its position all the time in vertical direction as its outer portion is in aperture 18.

Figure 7:
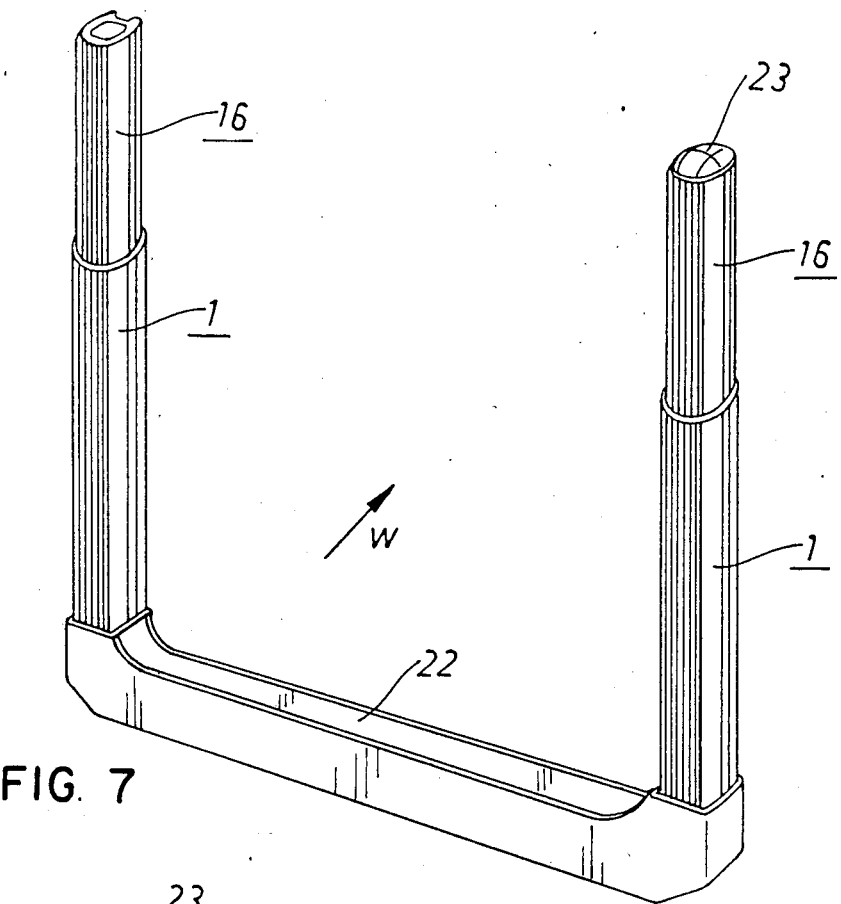
FIG. 7 illustrates the setting-up of post members.

FIG. 7 illustrates the mounting of post profiles 1 and 16 on the ends of the cross-beam 22 of a timber truck. The cross-beam or bench 22 is mounted crosswise on the chassis of a vehicle and the direction of air drag in forward drive is indicated with arrow w.

Figure 8:
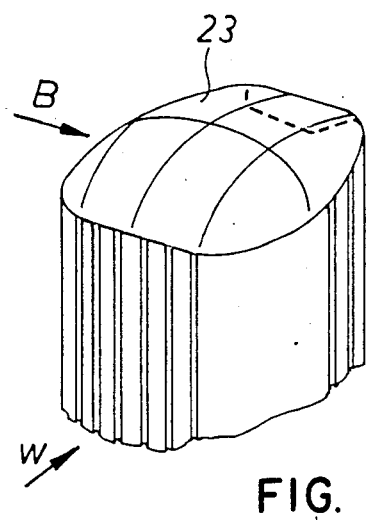
FIG. 8 shows a detail at the end portion of a post member.
Figure 9:
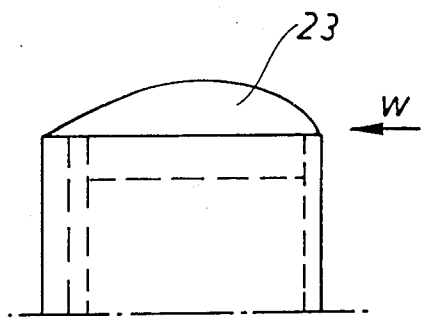
FIG. 9 is a view in the direction of arrow B in FIG. 8.

The right-hand extension profile 16 in FIG. 7 is further fitted with a cap member 23, shown to a larger scale in FIG. 8. In order to take full advantage of the invention all the time, it is obvious that the open end of an extension profile would provide one source of air drag and therefore the top end of extension profile 16 is closed by means of a cap member 23 which is streamlined, as shown in side view (in FIG. 9).

Figure 10:
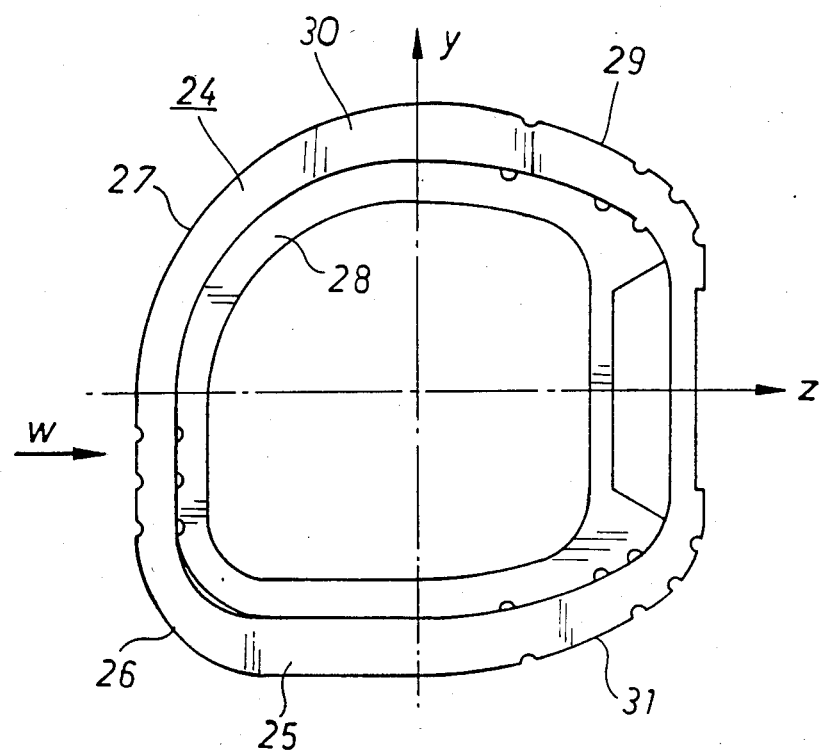
FIG. 10 shows an alternative cross-section of a post member.

FIG. 10 illustrates another embodiment 24 of the main profile. The basic difference from the above main main profile 1 is that, as shown in the figure, the profile is also asymmetrical relative to z-axis in a manner that the amount of material within the area of side wall 25 facing the load has been increased in order to increase bending resistance in the direction of main loading. This has been accomplished by reducing the radius of curvature of the leading corner facing the load (26) and, on the other hand, the radius of curvature of the leading corner 27 facing away from the load has been increased for making the leading profile section as a whole as rounded as possible. Otherwise, when progressing from y-axis to the trailing area relative to the flow, side walls 25, 30 curve with relatively long radii of curvature towards z-axis. As for the turbulence recesses, what was stated in connection with FIGS. 3 and 4 is also true in the case of FIG. 10. In FIG. 10, an extension profile 28 is shown directly inside the main profile 24 and said extension profile 28 of course conforms here with the shapes of its main profile.

It is apparent that in the illustrated embodiments "the turbulence recesses" 13, 14 and 15 can be replaced e.g. with a suitable roughening or with ridges protruding slightly from the surface. In the latter case, the main profile inner wall is provided with suitable recesses aligned with the extension profile ridges for receiving said ridges.

In terms of rounding the corners (5, 6, 7, 8, 26, 27, 29 and 31) there was also mentioned a mean radius of curvature, which concept also covers rather short straight sections in these areas.

I claim:

1. A side limit post for a load-carrying space, comprising a main profile and possibly an extension profile, characterized in that a cross-sectional profile, which is substantially quadratic in its main dimensions, is vigorously rounded in its leading corners (5, 26, 27) and also rounded in its side walls (2, 25, 30) as from its axis (y) parallel to the main loading direction towards a neutral axis (z) with a mean radius of curvature (7, 29, 31) exceeding or equal to that of leading edges (5, 26, 27), whereby the area of the outer surface (7, 29, 31) of side wall (2, 25, 30) following the outset point of the flow (w) trailing section is provided with an abrupt surface irregularity (13) for generating turbulence, one or more of such irregularities (14) being possibly made in the subsequent trailing section (7, 10, 29, 31) or said irregularity (13) possibly extending to said subsequent trailing section, whereby the front surface of leading wall (3) can also be provided with flow-disturbing surface irregularities (15).

2. A side limit post for a load-carrying space as set forth in claim 1, characterized in that the walls (2, 25, 30) furthest away from the neutral axis (z) of main loading direction are thicker than the wall sections (3, 4) perpendicular to said axis (z).

3. A side limit post for a load-carrying space as set forth in claim 1, characterized in that the trailing surface (4) of an extension profile (16, 28) is provided with a recess (17) for receiving a threaded element (20) for a locking screw (19) of the extension post (16, 28).

4. A side limit post for a load-carrying space as set forth in claim 1, characterized in that the free top end of post profile (1, 16, 24 or 28) is fitted with a streamlined cap member (23).

5. A side load post for a load-carrying space as set forth in claim 2, characterized in that the free top end of post profile (1, 16, 24 or 25) is fitted with a streamlined cap member (23).

6. A side load post for a load-carrying space as set forth in claim 3, characterized in that the free top end of post profile (1, 16, 24 or 28) is fitted with a streamlined cap member (23).

7. A side limit post for a load-carrying space as set forth in claim 2, characterized in that the trailing surface (4) of an extension profile (16, 28) is provided with a recess (17) for receiving a threaded element (20) for a locking screw (19) of the extension post (16, 28).

8. A side limit post for a load-carrying space as set forth in claim 5, characterized in that the trailing surface (4) of an extension profile (16, 28) is provided with a recess (17) for receiving a threaded element (20) for a locking screw (19) of the extension post (16, 28).

* * * * *

UNITED STATES PATENT AND TRADEMARK OFFICE
CERTIFICATE OF CORRECTION

PATENT NO. : 4,668,000
DATED : May 26, 1987
INVENTOR(S) : Heikki Jokela It is certified that error appears in the above-identified patent and that said Letters Patent are hereby corrected as shown below:

Column 2, line 2, "ecnomy" should be -- economy --.
Column 3, line 5, "käsikirja" should be -- Käsikirja --.
Column 5, line 10, "factor" should be -- factors --.
Column 5, line 12, "loaded" should be -- located --.
Column 5, line 28, "techniques" should be -- technique --.
Column 6, line 29, "slideably" should be -- slidably --.
Column 6, line 32, "pushded" should be -- pushed --.
Column 6, line 63, delete "main".
Claim 5, column 8, line 22, "25" should be -- 28 --.

Signed and Sealed this

Thirteenth Day of October, 1987

*Attest:*

DONALD J. QUIGG

*Attesting Officer*  *Commissioner of Patents and Trademarks*